United States Patent [19]

Quinn et al.

[11] Patent Number: 4,973,456
[45] Date of Patent: * Nov. 27, 1990

[54] USE OF SALT HYDRATES AS REVERSIBLE ABSORBENTS OF ACID GASES

[75] Inventors: Robert Quinn, East Texas; Guido P. Pez, Allentown, both of Pa.

[73] Assignee: Air Products and Chemicals, Inc., Allentown, Pa.

[*] Notice: The portion of the term of this patent subsequent to Oct. 25, 2005 has been disclaimed.

[21] Appl. No.: 261,653

[22] Filed: Oct. 24, 1988

[51] Int. Cl.$^5$ .................. B01D 47/00; C01B 17/16; C01C 3/00; B01J 8/00
[52] U.S. Cl. .................. 423/210.5; 423/226; 423/230; 423/236; 423/243; 423/244; 423/245.1
[58] Field of Search ............ 423/244 A, 244 R, 210.5, 423/245.1, 245.2, 224, 225, 230, 576.8, 236, 226, 243

[56] References Cited

U.S. PATENT DOCUMENTS

| | | | |
|---|---|---|---|
| 1,990,217 | 2/1935 | Baehr et al. | 423/226 |
| 3,042,483 | 7/1962 | Wolfram et al. | 23/2 |
| 4,086,423 | 3/1978 | Smith et al. | 423/245.2 |
| 4,211,761 | 7/1980 | Tung | 423/243 |
| 4,235,607 | 11/1980 | Kinder et al. | 55/68 |
| 4,239,510 | 12/1980 | Hays et al. | 55/68 |
| 4,472,283 | 9/1984 | Brooks et al. | 210/698 |
| 4,780,114 | 10/1988 | Quinn et al. | 423/244 |

FOREIGN PATENT DOCUMENTS

| | | |
|---|---|---|
| 1177619 | 9/1964 | Fed. Rep. of Germany . |
| 2605618 | 8/1977 | Fed. Rep. of Germany . |
| 1135262 | 4/1957 | France . |
| 61-101244 | 7/1986 | Japan . |
| 831532 | 3/1960 | United Kingdom . |

OTHER PUBLICATIONS

Lawlor et al., Inorganic Chem., 18, No. 1979, pp. 2923-2924.
Hydrocarbon Processing, (Apr. 1988), pp. 57-80.
S. C. Nirula et al., SRI International Report No. 180, Dec. 1987.
J. J. McKetta et al., Encyclopedia of Chemical Processing and Design, vol. 6, pp. 292-310 (1978).
Gryer and Pumer, Helv. Chim. Acta. 21, 1337-1345 (1938).
Solubilities of Inorganic and Metal-Organic Compounds, Linke, Editor, vol. 1 (1958).
Fuels and Coal Products (1959), p. 19357, "Purification of Gas", H. Guinot et al., Fr. Patent No. 1,130,145.
R. Vaikunrm et al., "Kinetics of the Na$_2$CrO$_4$ & CO$_2$ Reaction", Ind. J. Tech., 16, pp. 379-383 (1978).
Belton et al., J. Inorg. Nucl. Chem. 43, pp. 614-615 (1981).
F. Siel et al., Angew. Chem., vol. 67, No. 1, pp. 32-33 (1955).

Primary Examiner—Gregory A. Heller
Attorney, Agent, or Firm—Mark L. Rodgers; William F. Marsh; James C. Simmons

[57] ABSTRACT

The present invention is a process for reversibly absorbing acid gases, such as CO$_2$, H$_2$S, SO$_2$, HCN and the like from gas mixtures. The gas mixture containing one or more of these acid gases is contacted with a hydrated salt of the composition $$A_x^{m+} + B_y^{n-} \cdot rH_2O$$

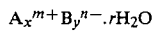

wherein A$^{m+}$ is a cation, B$^{n-}$ is the conjugate base of a weak acid having a pKa corresponding to an ionization constant of the acid greater than 3 as measured in dilute aqueous solution, m and n are independently integers from 1-4, x and y are integers such that the ratio of x to y provides a neutral salt and r is any number greater than zero up to the maximum number of moles of water which can be bound to the salt. The salt hydrate reversibly absorbs the acid gas from the gas mixture.

16 Claims, No Drawings

USE OF SALT HYDRATES AS REVERSIBLE ABSORBENTS OF ACID GASES

TECHNICAL FIELD

The present invention relates generally to the removal of acid gases, especially $CO_2$, from gas mixtures.

BACKGROUND OF THE INVENTION

Prior art $CO_2$ absorbent systems generally fall into one of two categories: (1) amines or (2) aqueous salt solutions.

A variety of amines, mostly alkanolamines, are used as $CO_2$ absorbents; see Hydrocarbon Processing, 57–80 (April 1988). Primary and secondary amines, such as monoethanolamine (MEA) and diethanolamine (DEA), react with $CO_2$ to form carbamates in accordance with the following reaction:

$$2RNH_2 + CO_2 \rightleftharpoons RNHCO_2^- + RNH_3^+$$

Since carbamates are relatively stable, heating is required to regenerate the $CO_2$-free absorbent. Typical heats of reaction of amines with $CO_2$ are relatively high, 10–20 kcal/mole $CO_2$. Tertiary amines, such as triethanolamine (TEA) and methyldiethanolamine (MDEA), cannot form carbamates. Such amines generate hydroxide in aqueous solutions and hydroxide subsequently reacts with $CO_2$ to give $HCO_3^-$ and/or $CO_3^{2-}$. The heats of reaction of $CO_2$ with tertiary amines are less than those of primary and secondary amines and less energy is needed to desorb $CO_2$ from tertiary amine solutions.

Recently, the use of sterically hindered amines as $CO_2$ absorbents was reported by Nirula, S. C.; Ashraf, M. SRI International Report No. 180 (1987). Due to steric hinderance at the amine nitrogen, the resulting carbamate is less stable than that of an unhindered amine, resulting in absorption capacities and rates greater than those of conventional amines. Conventional amines have capacities of only 0.5 mole $CO_2$/mole amine except at quite high pressures. Two moles of amine are necessary to form one mole of carbamate. Since the carbamate is stable, hydrolysis to $HCO_3^-$ and protonated amine does not occur readily. By contrast, the unstable carbamate of a hindered amine is readily hydrolyzed and a maximum capacity of 1.0 mole $CO_2$/mole amine can be obtained.

The absorption of $CO_2$ using aqueous solutions of strongly alkaline salts has been practiced for over 50 years and numerous reviews of the subject are available, see Encyclopedia of Chemical Processing and Design McKetta, J. J. Editor Vol. 6, p 292–310 (1978). The most commonly used salts are sodium and potassium carbonate, phosphate, borate, arsenite, and phenolate. The common use of potassium carbonate at relatively high temperatures for both absorption and desorption led to the hot potassium carbonate or hot pot process (HPC) in the early 1950s. The addition of activators or catalysts to enhance the rates of absorption and desorption and of corrosion inhibitors followed.

Several processes have been developed which use aqueous potassium carbonate with added activators (e.g. alkanolamines) and corrosion inhibitors. In one well known process, the Giammarco-Vetrocoke process, activators such as glycine, arsenic trioxide, and selenous acid are used. The Alkazid process uses aqueous solutions of potassium methylaminopropionate or, in some cases, sodium phenolate. The SRI International report cited above also teaches the use of sterically hindered amines as activators for potassium carbonate solutions. In all of the above aqueous salt processes, a strongly alkaline salt results in a high concentration of hydroxide. Reaction of $CO_2$ with hydroxide leads to bicarbonate and/or carbonate. $CO_2$ is desorbed by decomposition of bicarbonate which, at high hydroxide concentrations, requires heating.

Processes using strongly alkaline amino acid salts have also been reported. Amino acid salts can also react with $CO_2$ to form carbamates. Guyer and Purner, Helv. Chim. Acta 21, 1337–1345 (1938), evaluated solutions of the sodium and potassium salts of glycine and alanine as $CO_2$ absorbents. $CO_2$ desorption required heating. U.S. Pat. No. 3,042,483 describes the use of concentrated aqueous solutions of salts of amino acids as $CO_2$ absorbents. In particular, salts of taurine and substituted taurines, glycine, alanine, and sarcosine are claimed as absorbents. Each absorbent is either a primary or secondary amine capable of carbamate formation. Heat is required for desorption. German Pat. No. 2,605,618 describes the use of aqueous solutions of potassium methylaminopropionate to absorb $CO_2$ from air. The absorbent is regenerated by steam stripping. South African Pat. No. 7,603,420 reports the use of aqueous solutions of alkali metal salts of N-dialkylaminomonocarboxylic acids as $CO_2$ absorbents between 20° and 60° C. $CO_2$ is removed under reduced pressure and, optionally, heating. Japanese Pat. No. 61-101244 describes the preparation of an absorbent consisting of an alkali metal salt of N-methylalanine support on a porous material (e.g. alumina). The supported salt is capable of absorbing $CO_2$ in closed spaces, apparently via hydrolysis and formation of $K_2CO_3$. The absorbent is regenerated by heating up to 200° C. with no reported salt decomposition.

A number of reports have been written describing the solubility of $CO_2$ in aqueous solutions of weakly alkaline salts. The solubility of $CO_2$ in aqueous solutions of the sodium salts of succinic, oxalic, and malonic acids, potassium chromate, potassium fluoride, borax, ammonium molybdate, and others were determined to obtain equilibrium constants of weak acids. As reported in Solubilities of Inorganic and Metal-Organic Compounds, Linke, W. F. Editor, Vol. I (1958), the $CO_2$ solubilities are somewhat greater than those of aqueous solutions containing neutral salts. For example, at 30° C. the solubility of $CO_2$ in 1.19M KF is 0.14M versus that in water, 0.032M. Fr. Pat. No. 1130145 describes the use of aqueous solutions of $K_2HPO_4$ to absorb $CO_2$ and $H_2S$. The absorbent was regenerated by blowing with an inert gas or by application of a slight vacuum. Fr. Pat. No. 1135262 describes the use of weakly basic salt solutions as absorbents. A salt containing the anion, A, of a weak acid is used and the following reaction occurs:

$$NaA + CO_2 + H_2O \rightleftharpoons AH + NaHCO_3$$

1.5M solutions of $Na_2HPO_4$ and $Na_2CrO_4$ are cited as examples. Desorption of $CO_2$ does not require heating. The first addition to this patent, addition No. 68,830 describes the use of 1.5M aqueous solutions of alkali metal and ethanolamine salts containing various anions, among them, sulfite, malate, succinate, and malonate. The best results were obtained for acids which results in pH of 4–5 and salts with pH of 9–10. In the second addition to the above patent, addition No. 71,112, a variation using aqueous potassium chromate is described where slight heating (to 50° C.) is used for desorption. The above patents and additions also appeared as Brit. Pat. No. 831532.

Ger. Pat. No. 1177619 describes the use of aqueous solutions of alkali salts of heteropoly acids, where one is a weak acid and the other is a weak to medium strong acid, as $CO_2$ absorbents. The absorbent can be regenerated by treating with air at 30° C.

The kinetics of the reaction of $CO_2$ with aqueous $Na_2CrO_4$ has been investigated by R. Vaikunrm, et al. Ind. J. Tech. 16 379-383 (1978). The reaction generates $HCO_3^-$ and $Cr_2O_7^{2-}$ and is second order in chromate. Belton et al. J. Inorg. Nucl. Chem. 43, 614–615 (1981) reported that the reaction of $CO_2$ with solid $Na_3PO_4 \cdot 11H_2O$ results in the apparently irreversible formation of $Na_2HPO_4 \cdot 7H_2O$ and $NaHCO_3$.

U.S. Pat. Nos. 4,235,607 and 4,239,510[27] describe a method for purification of natural gas by removal of $CO_2$. The absorbent is sea water and the separation apparatus is constructed near the ocean floor. $CO_2$ rich sea water is simply discharge without regeneration.

U.S. Pat. No. 4,472,283 reports that retardation of the loss of $CO_2$ from circulating water can be obtained by addition of less than 50 ppm of quaternary ammonium salts of chloride or bromide. The addition of such salts, however, appears to have no effects on the solubility of $CO_2$ in water.

Seel, et al. in Angew. Chem., Vol. 67 No. 1. pp 32-33 (1955) report the formation of adducts of $SO_2$ with anhydrous salts such as $(CH_2)_4NF$, $KF$, $NaF$ and $RbF$.

BRIEF SUMMARY OF THE INVENTION

The present invention is a process for removing acid gases from a gas mixture by contacting said gas mixture with a salt hydrate or molten salt hydrate which reversibly absorbs the acid gases. The hydrated salt is of the composition $$A_x^{m+} B_y^{n-} \cdot rH_2O$$

wherein $A^{m+}$ is a cation, $B^{n-}$ is the conjugate base of a weak acid having a pKa corresponding to an ionization constant of the acid greater than 3 as measured in dilute aqueous solution, m and n are independently integers from 1-4, x and y are integers, typically from 1-6, such that the ratio of x to y provides a neutral salt, and r is any number greater than zero up to the maximum number of moles of water which can be bound to the salt. In a preferred embodiment, $A^+$ is a monovalent cation; i.e., m=1.

The salt hydrates employed in the present invention are advantageous in that they are capable of absorbing and desorbing acid gases at the same temperature, although different absorption and desorption temperatures can be used. The salt hydrates also exhibit unexpectedly high acid gas sorption capacities at mild reaction conditions thereby providing for a simple and efficient alternative to current acid gas absorbent technology.

DETAILED DESCRIPTION OF THE INVENTION

The present invention involves the use of salt hydrates as reversible absorbents of acid gases, such as $CO_2$, $H_2S$, $SO_2$, $HCN$, $COS$ and the like. Typically, a salt is defined as a substance comprised of cations and anions and characterized by overall electrical neutrality. A salt hydrate is a salt which contains bound water. The composition of a salt hydrate is typically represented by a formula of the form $A_x^{m+} B_y^{n-} \cdot rH_2O$ where $A^{m+}$ is a cation and $B^{n-}$ is an anion, m and n are independently integers from 1-4, x and y are integers such that the ratio of x to y provides a neutral salt, and r is the number of moles of water bound per mole of salt which for most salt hydrates will range between 0.5 and 24 and is typically up to 6 moles of water per mole of cation and independently up to 6 moles of water per mole of anion present in the salt. The term salt hydrate does not indicate the manner or degree of tenacity by which water molecules are bound to the salt. Many salts exist as hydrates and, upon heating, melt to yield liquids which contain bound water. Such systems are known as "molten salt hydrates" or "hydrate melts" which herein are included under the general term "salt hydrate". Examples of substances which yield molten salt hydrates are $MgCl_2 \cdot 6H_2O$ (melting point 117° C.), $Ca(NO_3)_2 \cdot 4H_2O$ (mp 39° C.), and $CaCl_2 \cdot 6H_2O$ (mp 29° C.). There are also salt hydrates which are liquids at room temperature and solidify below room temperature. An example of such a room temperature melt is 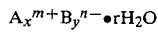$/4H_2O$ which freezes at 19.3° C. to yield a single solid phase. Other examples of salt hydrates which are liquids at room temperature are $NaHS \cdot 3H_2O$ (mp 22° C.), $AlBr_3 \cdot 15H_2O$ (mp $-7.5°$ C.), $Na_2MnO_4 \cdot 10H_2O$ (mp 17° C.), $KV(SO_4)_2 \cdot 12H_2O$ (20° C.), and $CsGe(SO_4)_2 \cdot 12H_2O$ (mp 2.113° C.).

It is important to emphasize that "molten salt hydrates" are not merely concentrated aqueous solutions. As described by H. H. Emons in Oester. Chem. 2. 87, 3–9 (1986), molten salt hydrates MSH supply "a link between (aqueous) electrolyte solutions and salt melts" and are viewed as containing the minimum quantity of water necessary to fill the primary hydration spheres of the ions. Since water in excess of the primary hydration spheres is absent, water-ion interactions dominate and, unlike aqueous solutions, exclusive $H_2O-H_2O$ interactions are absent. Such differences necessarily influence the chemical properties of both the salt and the bound water. Hence, the bulk water in an aqueous solution and the bound water in a MSH are chemically different. Such differences are reflected in various thermodynamic and other properties such as enthalpy of evaporation, conductivity, and partial molar dilution enthalpy. Differences between MSH and aqueous solutions are also reflected by the fact that both systems cannot be adequately described by the same theoretical model.

In the present invention, certain salt hydrates or MSH are used as reversible absorbents of acid gases, particularly $CO_2$. The acid gases react with either the solid salt hydrate or the molten salt hydrate in the temperature range of about 0° to 200° C., preferably 20° to 80° C. The use of a number of different salt hydrates is illustrated in the Examples which follow. We have found that salt hydrates containing fluoride ions or the anions of certain carboxylic acids reversibly absorb unexpectedly large quantities of acid gases. For example, at 50° C. tetramethylammonium fluoride tetrahydrate (TMAF) absorbs 0.28 moles of $CO_2$ per mole of salt (equivalents) at a gas pressure of about 1 atm, corresponding to a calculated $CO_2$ concentration of about 1.9M (calculation based on the assumption that the densities of liquid and solid TMAF are approximately the same and that the absorbent volume is unchanged by dissolution of $CO_2$). The quantity of $CO_2$ absorbed at 50° C. is far in excess of that obtained for a normal aqueous salt solution, 3.4M NaCl, 0.01M $CO_2$, or for water, 0.02M $CO_2$. Additionally, it has been found that acid gas absorption by these particular salt hydrates is fully reversible. Gas is desorbed from the absorbent by simply lowering the $CO_2$ pressure above the melt. Other methods, such as heating could be used to desorb $CO_2$ although heating is not essential. It should be noted that TMAF need not be melted to absorb $CO_2$. At 30° C., solid TMAF liquefies in the presence of $CO_2$ gas and functions as a reversible absorbent.

An unexpectedly large $CO_2$ absorption capacity is not limited to TMAF alone but is apparently a property of other hydrates containing the fluoride ion. For example, $KF \cdot 4H_2O$ reversibly absorbs up to 0.22 equiv $CO_2$ at 40° C. Similarly, CsF in the presence of four equiv water reversibly absorbs 0.19 equiv $CO_2$ at 177 kPa.

Salt hydrates which contain the anion (conjugate base) of a weak acid also exhibit unusually high $CO_2$ absorption capacities. For example, tetraethylammonium acetate tetrahydrate (TEAA) reversibly absorbs large quantities of $CO_2$ at 50° C. At 146 kPa, 0.174 equiv $CO_2$ were absorbed. Tetramethylammonum malonate monohydrate (TMAM) in the presence of an additional 5.4 equiv water absorbs 0.29 equiv $CO_2$ at 119 kPa and 30° C. It has been found that, generally, any salt hydrate containing a monovalent cation and the anion (conjugate base) of an acid of $pK_a$ greater than 3 will exhibit an unexpectedly high $CO_2$ absorption capacity, similar to that of TEAA or TMAM.

Although we do not wish to be bound by theory, it is believed that the unusual reactivity of TMAF and similar salt hydrates results from the enhanced basicity of the fluoride ion in the presence of limited water. Hence, $F^-$ acts as a Bronsted base resulting in hydroxide ion which leads to the formation of $HCO_3^-$ in the following manner:

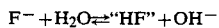

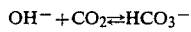

The conjugate acid of $F^-$ is represented as "HF" for simplicity. The exact nature of this species has not been established but is perhaps $HF_2^-$ or a $HF—H_2O$ hydrogen-bonded cluster. Salt hydrates which contain anions of certain carboxylic acids; e.g. acetate, citrate, malonate, ethylenediaminetetraacetate, etc., are believed to absorb $CO_2$ by a similar reaction pathway where a species resembling the conjugate acid of the anion is formed.

Salt hydrates which contain anions from relatively strong acids; i.e., pKa of 3 or less, exhibit more normal or expectedly low $CO_2$ absorption capacities. As detailed in Example 6 below, $(CH_3)_4NCl$ in the presence of 4 equivalents of water dissolves only 0.002 equiv $CO_2$ (0.01M $CO_2$) at 30C and 136 kPa. Similarly, salts containing anions of carboxylic acid with pKa values of 3 or less exhibit normal $CO_2$ capacities. For example, $(CH_3)_4NCF_3CO_2$ in 4 equivalents of water dissolves 0.011 equiv $CO_2$ (0.05M $CO_2$) at 30C and 133 kPa. Both of these $CO_2$ capacities are close to those of dilute aqueous salt solutions.

The absorption capacities of salt hydrates are sensitive to the quantity of water present. Generally some quantity of water must be present to achieve the desired absorption capacity, although too much water, typically greater than about 12 moles per mole of salt has a detrimental effect on absorption. Example 7 below lists the $CO_2$ capacities of samples containing CsF in the presence of various concentrations of water. In this survey, only one absorption point was obtained for each sample and, hence, the final equilibrium pressure of $CO_2$ above each sample is not the same. In any case, it is evident from the data of Example 7 that dry CsF absorbs almost no $CO_2$. At 0.5 equiv water, 0.39 equiv $CO_2$ were absorbed at 19.8 kPa. CsF in the presence of 4 equiv water absorbed 0.11 equiv $CO_2$ at 77.8 kPa (1.1M $CO_2$). However, with 20 equiv water present only 0.033 equiv $CO_2$ (0.085M) were absorbed at 134 kPa, approaching the value expected for a normal aqueous salt solution.

While the above discussion details the use of salt hydrates as $CO_2$ absorbents such salt hydrates should also be useful for absorbing other acid gases such as $H_2S$, $SO_2$, HCN, COS, and the like. The formation of adducts of $SO_2$ with $(CH_3)_4NF$, KF, NaF, and RbF, all apparently anhydrous salts, have been reported (Angew. Chem. 67, 32–33 (1955). This process, however, reportedly proceeds by direct reaction of $F^-$ with $SO_2$ to yield the fluorosulfinate ion, $SO_2F^-$. In the presence of water, $HF_2^-$ and $HSO_3^-$ are generated. Hence, it is reasonable to expect that TMAF would react with $SO_2$ as follows:

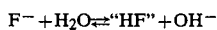

It is expected that $H_2S$ would be absorbed by TMAF to generated $HS^-$ by the reaction:

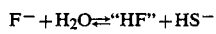

The uniqueness of salt hydrates as $CO_2$ absorbents arises from the observation that the solubility of $CO_2$ in certain salt hydrates is far greater than can be reasonably expected based on the prior art and on traditional chemical wisdom. These materials do not contain anions which are strong bases, such as hydroxide, carbonate, phosphates, or borates. Salt solutions containing these strongly basic anions exhibit predictably high $CO_2$ solubilities and have been used as absorbents for over 50 years. The present inventions describes the use of salt hydrates which contain anions which are generally considered to be weak bases ($pK_a$ of conjugate acid greater than 3). Although a solubility of $CO_2$ greater than that in water has been reported for aqueous 1.19M KF, the value, 0.14M, is far smaller than that of $KF \cdot 4H_2O$, 1.6M, or TMAF, 1.9M, all near 1 atm $CO_2$. In fact, addition of water to either $KF \cdot 4H_2O$ or TMAF saturated with $CO_2$ at 1 atm results is evolution of $CO_2$ gas, indicating that the addition of water results in a decrease in $CO_2$ solubility. A larger than expected $CO_2$ solubility is also exhibited by TEAA as set out in Example 2 below. At about 1 atm $CO_2$ and 50° C., the melt absorbs 0.16 equiv $CO_2$. These results are surprising in that nowhere in the literature has it been suggested that solutions of salts containing acetate ions would have higher than expected $CO_2$ solubilities. Additionally, the fact that salt hydrates or molten salt hydrates of the present invention reversibly absorb $CO_2$ in any amounts is unexpected in view of the prior art teachings.

The following examples are presented to better illustrate the present invention and are not meant to be limiting.

Experimental

The $CO_2$ absorption/desorption isotherms of the various salt hydrates were determined using manometric techniques. The salt used for each example was weighed into a stainless steel reaction vessel and attached to a vacuum line of known volume. The reaction vessel was maintained at a constant temperature. In-line pressure transducers were used to determine pressures. Dead volume of the system was determined by expansion of helium from the line at known volume and pressure into the reaction vessel. The vapor pressure of water above the salt hydrate was determined by exposing the solid or melt to a static vacuum and allowing the pressure to reach a maximum. It was assumed that the vapor pressure remained constant throughout the experiment and subsequent $CO_2$ pressures were corrected accordingly.

Isotherms were determined in the following manner. The line was charged with $CO_2$ to a known pressure and opened to the reaction vessel. The pressure was monitored until no further decrease was observed. The cylinder was closed, the line recharged with $CO_2$ to a higher pressure, and the above steps were repeated. Following the collection of absorption data, the reaction vessel was closed and the line was evacuated. The contents of the reaction vessel were opened to the line and the pressure was monitored until a maximum was reached. Subsequent desorption data were collected in the same manner.

EXAMPLE 1

Tetramethylammonium fluoride tetrahydrate(TMAF) at 50° C.

The reaction vessel was charged with 3.2594 g, 0.01973 mole, of TMAF, attached to the vacuum line, and maintained at 50° C. The vapor pressure of the melt was 1.4 kPa. $CO_2$ absorption/desorption data was calculated as described above and is listed in Table 1 below. The results are reported as moles of $CO_2$ per mole of salt as a function of $CO_2$ gas pressure.

TABLE 1

| TMAF at 50° C. | | | |
|---|---|---|---|
| Absorption | | Desorption | |
| P(kPa) | mole $CO_2$/ mole salt | P(kPa) | mole $CO_2$/ mole salt |
| 1.5 | 0.085 | 37.8 | 0.231 |
| 13.5 | 0.187 | 19.3 | 0.197 |
| 48.4 | 0.246 | 12.3 | 0.174 |
| 83.2 | 0.272 | 8.5 | 0.157 |
| 111.1 | 0.283 | 6.4 | 0.144 |
| | | 5.2 | 0.134 |
| | | 4.4 | 0.125 |
| | | 3.7 | 0.117 |
| | | 3.3 | 0.110 |
| | | 2.8 | 0.105 |

EXAMPLE 2.

Tetramethylammonium acetate tetrahydrate (TEAA) at 50° C.

The reaction vessel was charged with 3.0458 g, 0.01165 mole, of TEAA and attached to the vacuum line. The vessel was maintained at 50° C. At this temperature the vapor pressure of the melt was 2.5 kPa. Absorption/desorption data is reported in Table 2.

TABLE 2

| TEAA at 50° C. | | | |
|---|---|---|---|
| Absorption | | Desorption | |
| P(kPa) | mole $CO_2$/ mole salt | P(kPa) | mole $CO_2$/ mole salt |
| 19.4 | 0.065 | 43.2 | 0.0926 |
| 40.3 | 0.097 | 17.5 | 0.0550 |
| 71.7 | 0.127 | 6.6 | 0.0366 |
| 91.7 | 0.145 | 3.6 | 0.0255 |
| 146.2 | 0.174 | | |

EXAMPLE 3.

Potassium fluoride tetrahydrate, $KF \cdot 4H_2O$, at 40° C.

A sample of $KF \cdot 4H_2O$ was prepared by addition of two equivalents of water to $KF \cdot 2H_2O$. The reaction vessel was charged with 2.6332 g, 0.02798 mole, of the resulting melt and the vessel was maintained at 40° C. The vapor pressure of the melt was 1.8 kPa. Absorption/desorption data is listed in Table 3.

TABLE 3

| $KF.4H_2O$ at 40° C. | | | |
|---|---|---|---|
| Absorption | | Desorption | |
| P(kPa) | mole $CO_2$/ mole salt | P(kPa) | mole $CO_2$/ mole salt |
| 12.1 | 0.110 | 54.2 | 0.188 |
| 44.9 | 0.184 | 22.5 | 0.163 |
| 125.9 | 0.208 | 13.8 | 0.110 |
| 222.7 | 0.218 | 7.9 | 0.0997 |
| | | 4.0 | 0.0840 |

It should be noted that reaction of $KF \cdot 4H_2O$ with $CO_2$ at 40° C. resulted in the precipitation of some solid. Nonetheless, the absorption of $CO_2$ was reversible.

EXAMPLE 4.

Cesium fluoride, CsF, in the presence of 4 equivalents of water at 40° C.

The reaction vessel was charged with 6.5888 g of a solution containing CsF in 4 equivalents of water. The vessel was kept at 40° C. The vapor pressure above the solution was 1.6 kPa. Absorption/desorption data is listed in Table 4.

TABLE 4

| CsF in 4 equivalents of Water, 40° C. | | | |
|---|---|---|---|
| Absorption | | Desorption | |
| P(kPa) | mole $CO_2$/ mole salt | P(kPa) | mole $CO_2$/ mole salt |
| 5.9 | 0.062 | 56.0 | 0.143 |
| 46.1 | 0.130 | 25.7 | 0.114 |
| 118.5 | 0.172 | 14.5 | 0.096 |
| 176.5 | 0.192 | 10.8 | 0.081 |

EXAMPLE 5.

Tetramethylammonium malonate monohydrate (TMAM) in Water at 30° C.

A solution was prepared by adding 5.4 equivalents of water to TMAM. The reaction vessel was charged with 3.1764 g of this solution which contained $8.707 \times 10^{-3}$ mole of salt. With the vessel at 30° C., the vapor pressure of the solution was 0.9 kPa. Absorption/desorption data is listed Table 5.

TABLE 5

| TMAM in water at 30° C. | | | |
|---|---|---|---|
| Absorption | | Desorption | |
| P(kPa) | mole $CO_2$/ mole salt | P(kPA) | mole $CO_2$/ mole salt |
| 13.4 | 0.116 | 36.1 | 0.201 |
| 45.2 | 0.191 | 16.3 | 0.146 |
| 70.7 | 0.237 | 8.8 | 0.114 |
| 119.4 | 0 289 | 5.6 | 0.0916 |
| | | 3.3 | 0.0791 |

EXAMPLE 6.

(Comparative) Tetramethylammonium chloride, $(CH_3)_4NCl$, and tetramethylammonium trifluoroacetate, $(CH_3)_4NCF_3CO_2$ in water.

For comparison the $CO_2$ absorption capacities of two salt solutions where only physical dissolution of $CO_2$ occurs were measured. A solution was prepared from $(CH_3)_4NCl$ and 4 equivalents of water. The reaction vessel was charged with 2.6481 g of the solution (0.01459 mole $(CH_3)_4NCl$), attached to the line and maintained at 30° C. The solution was exposed to 164 kPa $CO_2$ and the pressure monitored until $CO_2$ uptake was complete. At 135.6 kPa, 0.002 mole of $CO_2$ were absorbed per mole of salt (0.002M $CO_2$).

The $CO_2$ absorption capacity of $(CH_3)_4NCF_3CO_2$ in the presence of 4 equivalents of water was determined as for $(CH_3)_4NCl$. The reaction vessel was charged with 3.1240 g of solution (0.01205 mole $(CH_3)_4NCF_3CO_2$) and exposed to 164 kPa $CO_2$ at 30° C. At 133.1 kPa, 0.011 mole of $CO_2$ were absorbed per mole of salt (0.05M $CO_2$).

The results obtained for this example clearly show the superiority of the salt hydrates of the present invention over salt solutions where only physical dissolution of $CO_2$ occurs.

EXAMPLE 7.

CsF in the presence of various concentrations of water.

To a weighed sample of CsF was added a weighed amount of water. An aliquot was weighed into the reaction vessel and maintained at the indicated temperature. Each sample was exposed to about 160 kPa $CO_2$. The pressure was monitored until no further change was observed. Results are listed in Table 6.

TABLE 6

| CsF in the Presence of Various Water Concentrations | | | | |
|---|---|---|---|---|
| Equiv water | Temp. (°C.) | P($CO_2$) (kPa) | mole $CO_2$/ mole CsF | [$CO_2$] (M) |
| 0 | 35 | 131.9 | 0.005 | — |
| 0.5 | 35 | 19.8 | 0.394 | — |
| 1.0 | 35 | 46.5 | 0.428 | — |
| 2.5 | 35 | 28.1 | 0.19 | 2.6 |
| 4.0 | 35 | 77.8 | 0.11 | 1.1 |
| 8.0 | 35 | 114.7 | 0.07 | 0.4 |
| 12.0 | 33 | 133.9 | 0.05 | 0.2 |
| 20.0 | 20 | 133.5 | 0.09 | 0.09 |

The results reported in Table 6 above indicate that water in excess of that bound by the salt can be tolerated in the system, although the excess should be kept to a minimum as the absorption capacity decreases rapidly with the addition of excess water.

Having thus described the present invention, what is now deemed appropriate for Letters Patent is set out in the following appended claims.

What is claimed is:

1. A process for removing acid gases selected from the group consisting of $CO_2$, $H_2S$, $SO_2$, HCN, and COS from a gas mixture containing one or more of said acid gases and at least one other component, said process comprising:

bringing said gas mixture into contact with a hydrated salt of the composition $$A_x^{m+} B_y^{n-} \cdot rH_2O$$

wherein $A^{m+}$ is a cation, $B^{n-}$ is the conjugate base of a weak acid having a pKa corresponding to an ionization constant of the acid greater than 3 as measured in dilute aqueous solution, m and n are independently integers from 1–4, x and y are integers such that the ratio of x to y provides a neutral salt and r is any number greater than zero up to the maximum number of moles of water which can be bound to the salt; and carrying out said process at a temperature from 0° to 200° C. whereby said salt hydrate reversibly absorbs said acid gases thereby removing them from the gas mixture.

2. A process in accordance with claim 1 wherein m=1.

3. A process in accordance with claim 2 wherein $A^{m+}$ is an alkali metal cation.

4. A process in accordance with claim 2 wherein $A^{m+}$ is a quaternary ammonium ion of the formula $R_4N^+$, wherein R is a substituted or unsubstituted alkyl or aromatic group.

5. A process in accordance with claim 1 wherein $B^{n-}$ is a fluoride ion.

6. A process in accordance with claim 1 wherein $B^{n-}$ is an anion of a carboxylic acid.

7. A process in accordance with claim 5 wherein $B^{n-}$ is an anion of a carboxylic acid selected from the group consisting of acetate, malonate, citrate, ethylenediaminetetraacetate and nitrilotriacetate.

8. A process in accordance with claim 7 wherein said process is carried out at a temperature from 20° to 80° C.

9. A process in accordance with claim 1 wherein said salt hydrate is a molten salt hydrate.

10. A process in accordance with claim 2 wherein r is from 0.5 to 24.

11. A process in accordance with claim 10 wherein r is from 0.5 to 12.

12. A process in accordance with claim 10 wherein said salt hydrate is tetraethylammonium acetate tetrahydrate.

13. A process in accordance with claim 10 wherein said salt hydrate is tetramethylammonium malonate monohydrate.

14. A process in accordance with claim 10 wherein said salt hydrate is tetramethylammonium fluoride tetrahydrate.

15. A process in accordance with claim 1 wherein said salt hydrate is in the presence of up to 6 moles of water per mole of cation, and independently up to 6 moles of water per mole of anion present in the salt.

16. A process in accordance with claim 1 wherein said acid gas reversibly absorbed by said salt hydrate is $CO_2$.

* * * * *